(12) United States Patent
Nolan

(10) Patent No.: US 10,572,670 B2
(45) Date of Patent: Feb. 25, 2020

(54) AUTOMATED INFORMATION TECHNOLOGY SUBSTANTIVE TESTING OF SECURITY COMPLIANCE WITHIN A USER'S CONTEXT

(71) Applicant: Introspectus Pty Ltd, Australian Capital Territory (AU)

(72) Inventor: Eugene Sean Nolan, Australian Capital Territory (AU)

(73) Assignee: INTROSPECTUS PTY LTD, Australian Capital Territory (AU)

( * ) Notice: Subject to any disclaimer, the term of this patent is extended or adjusted under 35 U.S.C. 154(b) by 198 days.

(21) Appl. No.: 15/702,391

(22) Filed: Sep. 12, 2017

(65) Prior Publication Data
US 2019/0080094 A1    Mar. 14, 2019

(51) Int. Cl.
  *G06F 21/57* (2013.01)
  *G06F 11/36* (2006.01)
(52) U.S. Cl.
  CPC ........ *G06F 21/577* (2013.01); *G06F 11/3612* (2013.01); *G06F 2221/033* (2013.01)

(58) Field of Classification Search
  CPC ............... G06F 21/577; G06F 11/3612; G06F 2221/033
  See application file for complete search history.

(56) References Cited

U.S. PATENT DOCUMENTS

| | | | |
|---|---|---|---|
| 2013/0167250 A1* | 6/2013 | Balasubramanian | ... G06F 21/10 726/28 |
| 2014/0136245 A1* | 5/2014 | Wooldridge | ........... G06Q 40/08 705/4 |

* cited by examiner

*Primary Examiner* — Ellen Tran
(74) *Attorney, Agent, or Firm* — Westman, Champlin & Koehler, P.A.

(57) ABSTRACT

Current security tools in the marketplace fall into different categories: Security Enforcement Tools which identify and block malicious activity, and Security Vulnerability Testing Tools which scan and identify security threats within an organisation. The disclosure describes Silently (invisible to the user) but as if it is the user, within the User's Context, Executing applications to test whether third party security products and security settings exhibit the correct behaviour. The application can continuously perform a test(s) and expects a security product to behave in a certain way, records the result of the test(s) and reports those results.

10 Claims, 6 Drawing Sheets

```
Namespace PatentTestProgram {
    class Program {
        static void Main(string[] args) {
            return;
        }
    }
}
```

```
//COMMENT: The following example code demonstrates how a Collector Process can be coded to
perform the methods of the patent //COMMENT: The following are calls to various parts of the .Net framework. These are
required as we have written this example in C#, a .Net language.
using System;
using System.Diagnostics;
using System.Runtime.InteropServices;
using System.Threading;
using System.ComponentModel;

namespace PatentCollector {

//COMMENT: This first block of code as defined by the starting line "public static
class WhitelistTest {" is executed to perform a test on the Whitelisting Application
    //COMMENT: Referring to Figure 4, the following covers the Steps "Run External File,
this will provide us with a result", "Suppress Any Security Notifications" and "Add Result
of Test to Reporting File"
    //COMMENT: This block of code will be called after the "Wait for schedule or other
instruction to run tests" has determined that a test needs to commence, and based on the
flow chart it has been determined that a whitelist test needs to commence public static class WhitelistTest {

//COMMENT: This defines where the Collector Process will find the Child
Application. We have used the name tester.exe as a placeholder only.
        public readonly static string TESTER_PROGRAM =
Environment.GetFolderPath(Environment.SpecialFolder.CommonApplicationData) +
"\\tester.exe";

//COMMENT: This defines the results which can be returned from this particular
test, namely enabled, disabled or error.
        //COMMENT: Based on the rules of the test, this will be translated into a pass
or
fail result.
        public enum Results { Enabled, Disabled, Error }

//COMMENT: This is the programming method which is called by external code to
perform this specific test, in this case Whitelisting is the example given.
        public static Results doWhitelistTest() {
            SuppressPopups suppressPopups = null;
            //COMMENT: try / catches are used to run a piece of code, and should an error
happen during code surrounded by a try block, the program will revert to the code
surrounded by the catch block.
            try {

//COMMENT: This sets up the call to the Child Application.
                var psiUnauthorisedTest = new ProcessStartInfo(TESTER_PROGRAM);
                psiUnauthorisedTest.Arguments = "test";
                psiUnauthorisedTest.CreateNoWindow = true;
                psiUnauthorisedTest.WindowStyle = ProcessWindowStyle.Hidden;

//COMMENT: This will attempt to suppress popups which may have been
triggered as a result of this test. This calls the class object shown under the "public
class SuppressPopups : IDisposable {" heading.
                suppressPopups = new SuppressPopups();

//COMMENT: This calls the Child Application, placing the result of that
call into memory.
                var result = Process.Start(psiUnauthorisedTest);

//COMMENT: The time of 5 seconds is not important, as any amount of time
could be used here provided it is long enough to allow a reaction from the security
software.
```

*Figure 3A*

```
Thread.Sleep(5000);
            //COMMENT: This will stop popup suppression
            suppressPopups.Dispose();

//COMMENT: Where Execution of the Child Process was successful, or an
unexpected result was received, return either an error or disabled result.
            return (result == null ? Results.Error : Results.Disabled);
        }
            //COMMENT: The following code is the catch block. Should the code directly
above here trigger an error, the code inside the catch block will automatically start
Executing.
        catch {
            //COMMENT: The time of 5 seconds is not relevant, as any amount of time
could be used here provided it is long enough to allow a reaction from the security
software.
            Thread.Sleep(5000);
            //COMMENT: This will stop popup suppression
            suppressPopups.Dispose();
        }
            //COMMENT: As the code has not already returned a result, return a result
of
Enabled.
            return Results.Enabled;
        }
    }

//COMMENT: This second block of code as defined by the starting line "public static
class WhitelistTest (" is executed to suppress popups. In this case it is suppressing
"toast notifications"
    public class SuppressPopups : IDisposable {

//COMMENT: The following three DllImport blocks connect to a low level of the
operating system. This allows the code to send messages to other programs, including
Security Software.
        [DllImport("user32.dll", CharSet=CharSet.Unicode)]
        static extern IntPtr FindWindowEx(IntPtr parentHandle, IntPtr childAfter, string
lclassName, string windowTitle);

[DllImport("user32.dll")]
        [return: MarshalAs(UnmanagedType.Bool)]
        static extern bool IsWindowVisible(IntPtr hWnd);

[DllImport("user32.dll", CharSet = CharSet.Auto, SetLastError = false)]
        static extern IntPtr SendMessage(IntPtr hWnd, uint Msg, Int32 wParam, IntPtr
lParam);

//COMMENT: This the WM_LBUTTONDOWN message. This message when received by a "toast
notification" will be interpreted as a request to hide the notification.
        const uint WM_ID = 0x0201;

//COMMENT: A background worker allows code to run silently, without stopping
the
main program from running. Background workers can be considered the same as a thread.
        BackgroundWorker worker = new BackgroundWorker();

//COMMENT: This is the programming method which is called by external code to
suppress popups.
        public SuppressPopups() {

//COMMENT: This sets the background worker to execute the Worker_DoWork
programming method when this programming method is executed.
            worker.DoWork += Worker_DoWork;
```

*Figure 3B*

```
//COMMENT: This instructs the background worker to start Executing popup suppression.
        //COMMENT: As this is a RunWorkerAsync() method the program is effectively
forked at this point, allowing both the notification suppression and the test itself to
Execute at the same time.
        worker.RunWorkerAsync();
    }

//COMMENT: This is the programming method which actually performs the work of
suppressing popups.
        private void Worker_DoWork(object sender, DoWorkEventArgs e) {
            //COMMENT: This is the start of a loop. A loop will keep running the same
code until it is told otherwise.
            while(true) {

//COMMENT: This allows the CPU a small amount of time (1 millisecond)
to preform other tasks. The amount of time is not relevant, however increasing the time
beyond 1 millisecond is likely to affect the effectiveness of this programming method.
                Thread.Sleep(1);

//COMMENT: Get the pointer to the tooltips_class32 objects. A pointer
is a piece of memory which refers to another piece of memory. That memory can contain
either invisible data, or visible objects like popup windows.
                var pointer = FindWindowEx(IntPtr.Zero, IntPtr.Zero, "tooltips_class32",
"");
                //COMMENT: If the pointer is zero, it means that no "toast notifications"
have been found yet. If no "toast notifications" have been found, go back to the start
of the loop.
                if (pointer == IntPtr.Zero) {
                    continue;
                }

//COMMENT: The following will see if the pointer received points to a
popup window. This is a call to the low level of the operating system. If the pointer
points to a Window, the code inside the block will be Executed.
                if (IsWindowVisible(pointer)) {
                    //COMMENT: This code will send a message to the memory which the
pointer points to. This message will instruct the "toast notification" to hide.
                    SendMessage(pointer, WM_ID, 0, IntPtr.Zero);

//COMMENT: We give the "toast notification" 10 milliseconds to act
upon the message sent in the previous line.
                    //COMMENT: Once 10 milliseconds has elapsed the loop will continue
to monitor for "toast notifications".
                    //COMMENT: The amount of time is not relevant, however increasing
or decreasing this time might have unintended side effects.
                    Thread.Sleep(10);
                }
            }
        }

//COMMENT: This is the programming method which is called by external code to
stop suppressing popups.
        public void Dispose() {

//COMMENT: This instructs the background worker to stop suppressing popups.
            worker.Dispose();
        }

… # AUTOMATED INFORMATION TECHNOLOGY SUBSTANTIVE TESTING OF SECURITY COMPLIANCE WITHIN A USER'S CONTEXT

FIELD OF THE DISCLOSURE

The field of the disclosure is information technology Substantive Testing of security compliance.

BACKGROUND

Software applications are computer programs running on a Computer System which perform a group of functions, tasks or activities in a coordinated manner to benefit the user of the application which contrasts with System Software which perform a group of functions, tasks and activities in a coordinated manner to operate the Computer System that runs software applications.

The field of security monitoring and testing in a Computer Network is a broad area of activity which attempts to protect the performance of Software applications and Operating Systems.

Security Software includes Software installed on a Computer System to protect the Computer System from malicious damage. Security Software includes Security Enforcement Tools and Security Vulnerability Testing Tools.

Some Security Software is built into the Operating System itself, other Security Software is installed and configured by a third party and maintained and controlled remotely. Security Software does not need to have security as its focus; it just needs to deal with an aspect of the enforcement of security by having that Software installed. There are many ways the Security Software deals with the threat identified since the nature of the threat will best determine the required response. Not all security settings are applied by Security Software. Some are set by the Operating System or incorporated into applications.

Security frameworks identify many strategies for dealing with information security and represent a layered approach to Information Technology defence designed to protect Computer Systems and by extension Computer Networks to which that Computer System is connected and the data made available to them. While no single strategy can prevent malicious activity, a large proportion of incidents involving intrusion by bad actors could have been prevented if at least some of the following strategies were in place. Those strategies include, amongst others: application whitelisting; installing the latest patch of all application and Executable programs; installing the latest patch for the Operating System; restricting administrative privileges; disabling untrusted Microsoft "Office macros ["owned by Microsoft Corporation CA USA]; user application hardening; multi-factor authentication; periodic (daily at least) data back-ups; and many more, some of which are not even known yet as the threat vectors employed by bad actors continue to evolve and rely on decades of Software development that ignored or minimized data and operational security.

There are many aspects of the arrangements disclosed above which are not properly kept up to date, checked for compliance or otherwise tested.

To function as expected, Security Software relies on:
Security Software being correctly deployed, and
Security Software being correctly configured, and
Security Software being correctly maintained, and
Security Software working as intended, and
Security Software Reports being reviewed.

BRIEF DESCRIPTION OF ASPECTS OF THE DISCLOSURE

This document describes a method for automatically and Silently performing audits or Substantive Tests of the correct behaviour of third party Security Software associated with a Computer System and Computer Networks. The performance of the audits or Substantive Testing is done in the context of the user (User's Context) associated with the Computer System. Therefore the test is effectively performed as the user, without requiring interaction from that user, or the user needing to know that the test has been performed, or the outcome of that test.

Audits or Substantive Tests are performed in the expectation that the Security Software will behave in a certain way and the recording of the outcome and report of that outcome is made available as part of the method disclosed.

Child Application: The Child Application is any Software the Collector Process attempts to launch to test:
  the security of the Software; or
  the Operating System; or
  the User's Context settings; or
  other aspects of the Computer System and the Software used thereon.

In an aspect of the disclosure there is a method of testing for the effectiveness of one or many predetermined security aspects associated with a Computer System (or Computer Systems) while the Computer System is being used by a user having a predetermined User's Context, the steps of the method comprising:

a) Confirmation that a User's Context has been created. Where a Computer System comprises multiple User Context's, the steps below will apply to each User Context with the potential for different outcomes.
b) Executing the Collector Process within the User's Context.
c) Executing a Child Application on the Computer System having a testing functionality wherein the Software application or Child Application uses the Computer System according to the predetermined User's Context
d) (Optional) The Collector Process verifies that the Child Application's Hash matches a known Hash.
e) (Optional) If the Hash is not verified, the application will not Execute the Child Application.
f) The Collector Process monitors the Execution of the Child Application, and reports on successful, unsuccessful or failed Execution of the Child Application.
g) A test may either pass or fail, depending on the Substantive Test being performed.
h) The Collector Process records the result of the Substantive Test, passing the result to the Director Service (optional) which sends the result to a database for collation and reporting.
i) The Collector Process or the Director Service monitors the Operating System and suppresses any Notification to the user of the Computer System if such Notification is triggered by the creation or launch of the Collector Process or the Director Service or the Child Application.
j) Notifications that are created by the Operating System or other Software not associated with the activities of the Collector Process or the Director Service or the Child Application are not suppressed.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally regarding their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in Software, Executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

A detailed description of one or more preferred embodiments is provided below along with accompanying figures that illustrate by way of example the implementation of those embodiments. On the contrary, the scope of the disclosure is limited only by the appended claims and the disclosures encompass numerous alternatives, modifications, and equivalents. For example, numerous specific details are outlined in the following description to provide a thorough understanding of the presented implementations. The present disclosures may be worked according to the claims without some or all of these specific details. For clarity, technical material that is known in the respective technical fields has not been described in detail so that the present disclosure is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgement or any form of suggestion that such background or prior art forms part of the common general knowledge.

Suggestions and descriptions of other embodiments may be included within the disclosure but they may not be illustrated in the accompanying figures or features of the disclosure may be shown in the figures but not described in the specification.

Thus, if a Security Testing Software Application is run within the User's Context, that Security Testing Software Application has the same rights, privileges and restrictions as the logged on user. Other systems and Software will detect that the Security Testing Software Application is Executing and accept the consequent activity as being as if it were initiated by that user.

The above is true even if the user did not deliberately run or program to run the Security Testing Software Application.

Multi-user computing systems, such as terminal servers, allow multiple users to simultaneously be logged in, thus there are opportunities for multiple User's Contexts (one for each user) at the same time. Each user of that system is presented with their own User's Context which is not shared with any other user of that system. This does not affect how a User's Context operates.

BRIEF DESCRIPTION OF THE FIGURES

FIGS. 3A, 3B, and 3C depict example code which can be compiled into an Executable format;

DEFINITIONS

Figures 1, 2:
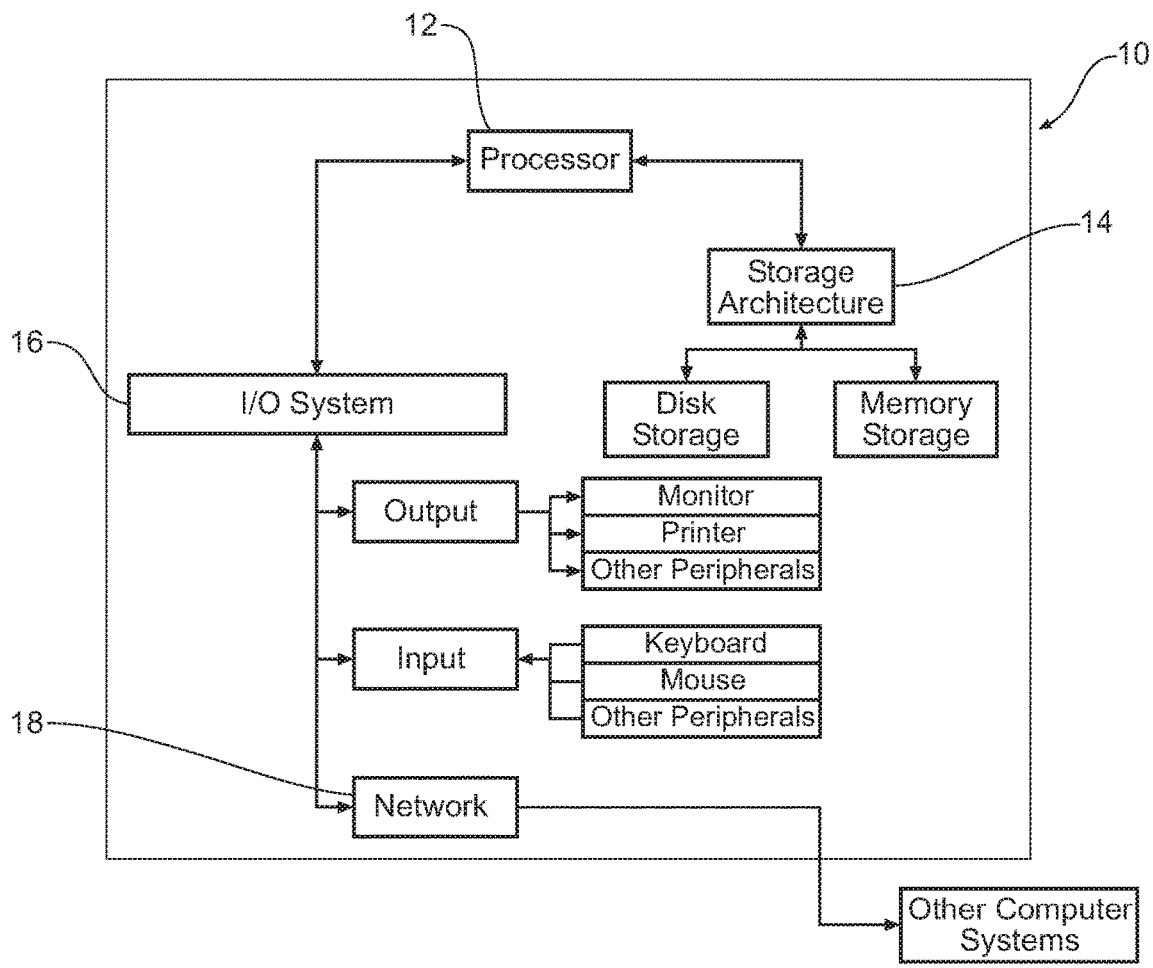
FIG. 1 depicts a Computer System, with the mandatory components of a processor, storage architecture and an I/O system, and the optional components of monitors, printers, keyboard, mouse, other peripherals and network.
FIG. 2 depicts example code which can be compiled into an Executable format.

Authentication/Authenticates: Authentication is how the user identifies to a Computer System. The visible element of this process is the logon screen where a user is prompted for credentials, such as a username, a password, or some other method provided by the Computer System to permit a person to identify that person to the computer (e.g. biometric, key card, etc.). Once a user has authenticated, the Computer System applies a predetermined User's Context to the use of that Computer System, so all actions by that user after a successful Authentication process are attributed to the authenticated user.

Child Application: The Child Application is any Software the Collector Process attempts to launch to test:
   the security of the Software; or
   the Operating System; or
   the User's Context settings; or
   other aspects of the Computer System and the Software used thereon.

Collector Process—The Collector Process is Software that runs within the User's Context performing predetermined tests as if it was the user of the Computer System and the Operating System used by the Computer System. The Collector Process performs many activities, with the following being the most relevant to the patent.
   The Collector Process may initiate Child Applications.
   The Collector Process may perform tests based on a schedule.
   The Collector Process runs a pre-defined test(s), based on a schedule, in the following manner:
     Automatically initiates a test(s);
     Silently without the user's knowledge or intervention;
     Suppresses any Security Notifications triggered by the creation and/or launch of the tests;
     Monitors the output of the test;
     Passes the output of the test to the Director Service.

Compliance Testing or Compliance Tests: Tests that check for the presence of the security controls being tested.

A Computer Network is a set of Computer Systems or other devices connected in a physical and logical way for the purpose of sharing data and resources such as files, printers, access to other networks, importantly the internet which itself is a collection of networks and computer devices.

Computer System is a system comprising:
at least one processor;
at least one memory architecture;
at least one software application Executable by at least one processor and using at least one memory architecture.

The Director Service runs at a System Level on a user's Computer System. The Director Service performs a large number of tasks including:

The Director Service monitors the creation or assignment of a User's Context.

On detection of a User's Context creation or assignment, the Director Service initiates an application within the User's Context called a Collector Process.

If more than one User's Context exists, the Director Service will initiate multiple concurrent Collector Processes, one in each User's Context.

If a user stops a Collector Process, or the Collector Process terminates unexpectedly, the Director Service will restart the Collector Process within the User's Context.

Execute/Executed/Executable/Execution—A term used to describe the starting/initiating of an application or a script on a Computer System and waiting for it to finish. When Software is started it is said to have been Executed.

File Permissions—File permissions are an optional security feature offered by most computer Operating Systems to restrict or permit access by the user and the programs they run to certain files and folders on a computer, also referred to as an Access Control List (ACL).

Notification or Notifications—The terms Notification, Pop-up notifications, toastings, Poptart, passive pop-ups, desktop notifications, notification bubbles, rustings, balloon notifications or simply Notifications all refer to a graphical control element that communicates certain events to the user without forcing them to react to this notification immediately, unlike conventional pop-up windows.

Operating System is System Software that manages computer hardware and software resources and provides common services for computer Software.

Hash: Overview of Hash algorithms—Although the use of a Hash algorithm is not essential in all aspects disclosed, Hash algorithms provide such advantages in the implementation of those aspects that an overview is warranted.

A Hash is a small amount of data which has been generated by parsing a variable amount of data into a hashing algorithm There are many types of hashing algorithms, each designed for a different purpose.

When a current hashing algorithm has been designed for security purposes it is mathematically unlikely that two pieces of data would produce the same Hash.

When a current hashing algorithm has been designed for security purposes and used appropriately the Hash cannot be used to recreate the original data.

Hashing algorithms designed for security purposes will be retired and replaced by new hashing algorithms as weaknesses are found.

Security Software is any Software, coding, patching, permission or setting which performs a security function. Security functions can include, but are not limited to: prevention of malware running, enforcing only authorized software, restricting the actions a user may undertake, or permitting the user to only undertake authorised actions.

Security Enforcement Tools is Security Software which identifies and blocks malicious activity. Examples of malicious activity include attempts to inject malware (Execution of software of the computing device designed to adversely or surreptitiously affect the operation of the device) and replication software to infect other Computer Systems on the same or even connected networks with that same malware or related malware; data/network sabotage; data theft; software tampering such that an attacker modifies exiting code to operate differently to perform unauthorised actions that tampering; etc. The range of threats is currently very large and growing in number and the sophistication of injection techniques and the resulting damage and disruption is ever becoming more devastating. In response to these types of threats those who design Security Enforcement Tools create software to identify and block the intended malicious activity and by doing so create security policies.

Security Vulnerability Testing Tools is Security Software which scans and identifies weaknesses or gaps in security that can be exploited by one or more threats within the information technology systems of an organisation. Examples of the types of security weaknesses include: unauthorised access control being the selective failure to restrict access to a Computer System and the resources it has access to and which can also include falsifying the auditing of that access and which can be effected by elevation of authorisation privilege; avoidance of authentication being the confirmation of the truth of an attribute of a single piece of data; usurping data integrity controls which can lead to data corruption, data loss or data theft. In response to these types of weaknesses those who design security vulnerability testing tools create software to identify weaknesses and block the exploitation of those weaknesses and by doing so create security settings.

Security Notification is any sort of alert generated by Security Software made visible to a user to advise the user that a security related event has occurred. Any Substantive Testing can potentially trigger a Security Notification.

Security Testing Software Application represents the Software disclosed in this specification.

Silently, Silent and Hidden—Software that Executes within a User's Context without the user's knowledge or interaction.

Software—is computer programs running on a Computer System which perform a group of functions, tasks or activities in a coordinated manner to benefit the user of the application which contrasts with System Software which perform a group of functions, tasks and activities in a coordinated manner to operate the Computer System that runs software applications. Software includes but is not limited to one or more computer readable and Executable instructions that cause a Computer System or other electronic device to perform functions, actions, and behave in a desired manner. The instructions may be embodied in various forms such as routines, algorithms, modules, or programs including separate applications or code from dynamically linked libraries. The Software may also be implemented in various forms such as a stand-alone program, a function call, a servlet, an applet, and an application, instructions stored in a memory, part of an Operating System or another type of Executable instructions including the obtaining of that software from a non-transitory computer-readable storage medium. It will be appreciated by one of ordinary skilled in the art that the form of software is dependent on, for example, requirements of the desired application, the environment it runs on, and the desires of a designer/programmer or the like.

Software Agent—is deployed to the user's Computer System and which contains a number of Software components, including a Director Service and a Collector Process. The Software Agent also contains other Software components which are used by the Director Service and the Collector Process.

Substantive Testing or Substantive Tests: Tests that check the effectiveness of the security controls being tested, by way of example, a test to prove compliance of third party Security Software against a security standard, however the test is initiated.

System Software is a type of computer program designed to run a computer's hardware and application Software.

System Level is Software that Executes on a Computer System but not in the User's Context.

User's Context refers to the user (be it a person or process) that is currently logged onto the computer Operating System as a user. The Operating System will generally permit one or more users to use the Computer System simultaneously but each user is provided a predetermined processing environment. The User's Context includes but is not limited to: the rights of the logged on user to use computer resources and which privileges and restrictions that user has when using that Computer System most of which are set by the Operating System, sometimes using group policy and others very specific to that user, for example the privileges and restrictions for one user may be different to other users.

DETAILED DESCRIPTION OF EMBODIMENTS

FIG. 1 depicts a Computer System 10. The processor 12, storage architecture 14 and I/O System 16 are mandatory components of a Computer System as they allow a Computer System to receive Input from the I/O system, processing that input in the processor, using the storage system to store data either temporarily in memory storage or permanently in disk storage, and then provide output back to the I/O System. A Computer System requires at least one input method and one output method to operate. Once that requirement is satisfied, all other components of the I/O system, including monitor, printer, keyboard, mouse, other peripherals and network is optional. Access to the information made available (such as the result of a Substantive Test) is provided by the network connection 18. The Computer System may also be the user of a computer program product residing on a non-transitory computer-readable storage medium having a plurality of instructions stored thereon, which, when Executed by a processor associated with a computer device, cause the processor to perform operations.

FIG. 2 depicts an example of how a person skilled in the art may choose to build a Child Application. The C# language is used only as an example, the functions could be written in any computer language.

In an embodiment there are at least the following two aspects of the implementation of the method of Executing a Security Software application in the User's Context. In this embodiment the Security Testing Software Application includes a Collector Process. While also in the embodiment there is a Director Service which is installed on the Computer System capable of monitoring the Execution of Software on the Computer System. In this embodiment both the Collector Process and the Director Service are installed on a Computer System as part of a package authorised by the administrator of the Computer System and installed by a Software Agent.

The Director Service is designed to monitor the creation or assignment of a User's Context. On creation or assignment of a User's Context the Director Service will initiate an application within the User's Context called a Collector Process. As a result any activity undertaken by the Collector Process will appear to have been performed by the user. In the case of a server (computer system designed to provide the functionality of a computer system to multiple users virtually simultaneously) servicing more than one user there will be more than one User's Context in existence, and the Director Service will initiate multiple concurrent Collector Processes, one in each User's Context.

The Collector Process performs a predetermined set of tests as if it was the user of the Computer System and the Operating System used by the Computer System. More details about the type of tests that can be performed are described for the purpose of example and not to limit the use of other test, will be described later in this document.

Since the Collector Process is Executing in the User's Context the Collector Process will invoke the same results as if the user or malicious code had run the tests.

The Collector Process and the Director Service run Silently and do not necessarily interact with the user, and thus the user will not be made aware of, or be able to control the operation of either of the Collector Process or the Director Service. When the Collector Process is Silently operated and automatically performing the pre-defined tests, it does not require interaction with the user.

The Computer System will have at System Level and application level, at least one, but typically many security related software code detection and mitigation applications, as well as a large variety of User's Context rights and polices of the logged on user to use computer resources; and privileges and restrictions.

In the situation where a test triggers one or more Notifications, (essentially notifying the breach of a security rule or other action relating to the security of the Computer System when the resources, privileges and restrictions set for the user are breeched), the Collector Process is configured to actively suppress any Notifications which may indicate to the user that the tests were performed.

It is an aspect of the disclosure the components described do not require interaction with the user of the Computer System, thus the output of the testing operates Silently as far as the user is able to discern. The Security Testing Software Application includes the ability to make available or generate a report to the administrator on the output of the Security Testing Software Application and thus effectiveness of the Security Software, as well when set up, to test and report on the User's Context configuration.

There are a number of methods of ensuring that Software on the Computer System runs in Silent mode. These methods are not a function of the operation of the Security Testing Software Application but rather a result of the Security Testing Software Application initiating a known mode of the Computer System, for example, the 'Window style hidden' mode of the Computer System. There are many other methods of ensuring Silent operational outcomes of the testing Software, such as active monitoring of the alert messages generated by other security related software or reports generated by the Operating System of the Computer System, etc. a variety of such methods will be disclosed in this document.

In an embodiment, the Security Testing Software Application is instantiated in a fully automated manner where the tests are performed according to a schedule, or performs testing when initiated by an administrator of the Computer System.

In an embodiment, the tests may result in the detection of three different possible states, where a state will be detected if the security testing is successful, and another state if the security testing was not successful, and another state if the security testing resulted in an error.

The Security Testing Software Application is adapted to confirm that a user can perform an action, or is prevented from performing an action. One of the set of tests is performed and there will be a result. The result is interpreted according to a rule set. Different test results will be determined by different rules.

In an embodiment the report to be made available or generated for the administrator can be configured to suit the administrator's needs.

In an embodiment, to test the Security Software's effectiveness a creation or Execution of a file (comprising a program or code) is used to trigger third party Security Software installed and operational on the Computer System to react to the creation or Execution of the file by the user. In one embodiment when the third party Security Software is functioning correctly it will block the file from being created or Executed. In another embodiment, if the file can be created and/or Executed then the third party Security Software is not functioning correctly and the user and the system they are authenticated on is vulnerable to exactly the threat the third party Security Software is meant to restrict, suppress or negate.

In an embodiment the Execution of the security Compliance Testing and Substantive Testing is not apparent to the user, and to achieve that, the Collector Process needs to suppress any Notifications to the end user which are triggered by the third party Security Software or the Operating System as a result of the Collector Process attempting to Execute the test program (Child Application) in a Silent state.

The Collector Process actively monitors third party Security Software programs for advisories such as Notifications and the creation of screen visible windows which would alert the user to the security breach as a result of the test having been performed. When a third party Security Software program attempts to display a Notification, the Collector Process suppresses the Notification by hiding the window or by triggering the Notification's own closure method before the end user is presented the Notification on the visual display device associated with the Computer System.

An optional aspect of the Collector Process is it verifies the Hash of the Child Application before Executing the Child Application test to confirm it is known and hasn't been tampered with. This is a non-essential step and the steps described can be used without this step.

In an embodiment the following steps are performed:
1. Confirmation that a User's Context has been created.
2. Executing the Collector Process within the User's Context.
3. Executing a Child Application on the Computer System having a testing functionality wherein the Software application or Child Application uses the Computer System according to the predetermined User's Context
4. (Optional) The Collector Process verifies that the Child Application's Hash matches a known Hash.
5. (Optional) If the Hash is not verified, the application will not Execute the Child Application.
6. The Collector Process monitors the Execution of the Child Application, and reports on successful, unsuccessful or failed Execution of the Child Application.
7. A test may either pass or fail, depending on the Substantive Test being performed.
8. The Collector Process records the result of the Substantive Test, passing the result to the Director Service (optional) which sends the result to a database for collation and reporting.
9. The Collector Process or the Director Service monitors the Operating System and suppresses any Notification to the user of the Computer System if such Notification is triggered by the creation or launch of the Collector Process or the Director Service or the Child Application.
10. Notifications that are created by the Operating System or other Software not associated with the activities of the Collector Process or the Director Service or the Child Application are not suppressed.
11. Loop back to 2.

Step 4 is an optional step to increase the security of the method. It is not required to successfully complete this method, however it is implemented to ensure the Child Application does not contain unexpected code.

A coded embodiment of the steps described is provided in FIGS. 3A, 3B, 3C, and 4. The language of the coded embodiment is the C# language; however the methods disclosed are language, Operating System and technology agnostic.

An embodiment of the method disclosed can be applied to test any Security Software which when working properly will prevent an action from happening. The suppression technique is appropriate to the types of Notifications which that Security Software may show.

The embodiment disclosed in FIGS. 3A, 3B, 3C and 4 is a test for whitelisting.

Application whitelisting of approved/trusted programs should prevent execution by the Computer System of unapproved/potentially malicious programs including .exe, DLL, scripts (e.g. Windows Script Host, PowerShell and HTA) and installers.

As illustrated in the coded embodiment in FIGS. 3A, 3B, 3C and 4, a program is Executing Silently, within the User's Context. The Collector Application expects the whitelisting security feature to prevent Execution of the Child Application instantiated by the Collector Application in this case, the Child Application, creates and Executes the tester.exe file.

A lack of success (error) detected by the Collector Application indicates that the Security Software functioned as expected and prevented the tester.exe file from Executing.

In this embodiment the Notification suppressor functionality of the Collector Process has targeted toast notifications as that is what this particular test will generate when the Security Software attempts to notify the user of the breach.

FIGS. 3A, 3B, and 3C depict an embodiment of source code which can be compiled to be the Collector Application which Executes within the User's Context. The embodiment source code when Executed tests a whitelist and suppresses Notifications to the user. This can optionally be incorporated into a larger application which runs additional tests, or used as a stand-alone tester.

FIGS. 3A, 3B, and 3C depict an example of how a person skilled in the art may choose to implement tests of Security Software. The C# language is used only as an example, the functions disclosed could be written in any computer language. Any line starting with //COMMENT: in FIGS. 3A, 3B, and 3C describes what the code is doing and also relates in part to the steps depicted in FIG. 4.

Figure 4:
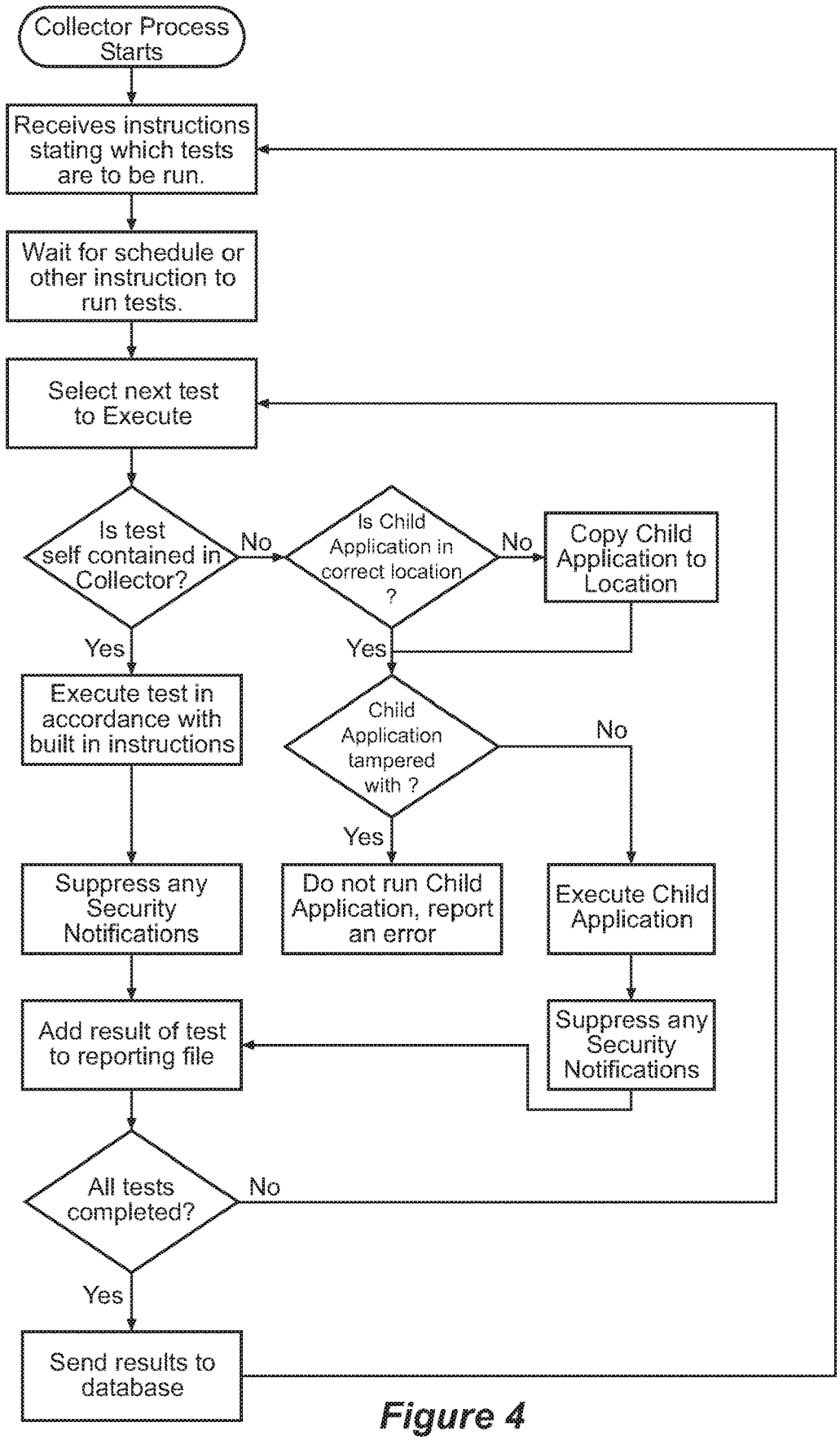
FIG. 4 shows the decision structure which the Collector will follow to determine how a Substantive Test is run.

FIG. 4 depicts the decision structure which the Collector Process will follow.

Collector Process starts—As the Collector Process starts as part of that startup routine it will launch code to commence testing of the Security Software Received instructions stating which tests are to be run—The Collector Process is managed (in this embodiment) from a central location, the Collector Process will obtain settings and instructions from that location Wait for schedule or other instruction to run tests—The Collector Process runs Substantive Tests on a schedule Select next test to Execute—The Collector Process has multiple tests which it Executes.

Is test self-contained in Collector Process—The Collector Process will only launch a Child Application if it is required to do so, otherwise the Collector Process will run the Substantive Test using its own code.

Is Child Application File/s in correct location—The Collector Process can attempt the Substantive Tests from multiple locations in a Computer System.

Copy Child Application Files to Location—The Collector Process will copy the Child Application to the location as required by the specific Substantive Test been Executed.

Child Application Tampered With—As an optional precaution it is possible to confirm the Hash of the Child Application before Executing it. This is done to ensure that the Child Application has not been modified by a malicious code or user.

Do not run Child Application, report error—If there is a problem with the Child Application which cannot be attributed to Security Software, the Collector Process will abort the test and report an error.

Execute Child Application. This will attempt to run the Child Application Silently and will report back the result of that Execution.

Suppress Security Notifications—This will attempt to suppress any Security Notifications created by Security Software as a result of the Substantive Test being seen by the user.

Run test in accordance with built in instructions. This will attempt to perform an action within the Collector Process Silently which should be blocked by the Security Software.

Add result to file—This will add the result of this test to file for making available or reporting back to the central server.

All tests completed—This will commence the next test if there are still tests which need to be completed.

Send results to database—This is an optional step as the results can merely be made available for inspection at predetermined intervals, stored for later inspection or just send the results to a central location, it will also confirm if there are new instructions for running tests next time around before waiting for the schedule to restart the testing or operate continuously.

Figure 5:
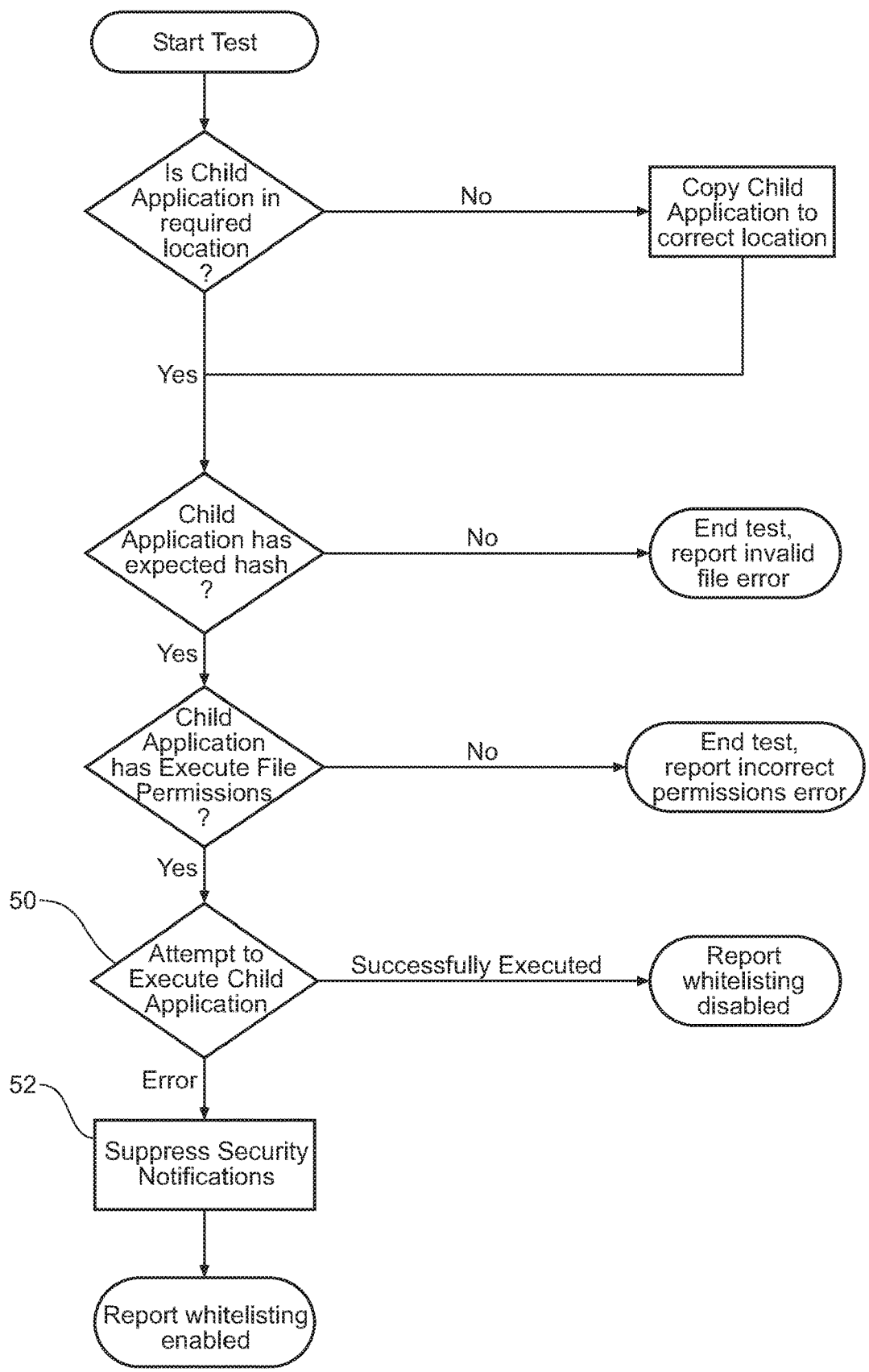
FIG. 5 depicts a flowchart showing an example of one of the Substantive Tests, in this case whitelisting.

FIG. 5 depicts a flowchart showing an example of one of the Substantive Tests. The steps 50 and 52 are demonstrated in code in FIGS. 3A and 3B.

FIG. 5 discloses an example of one of the Substantive Tests.

Start Test—The Collector Process has started the test of whitelisting in accordance with the schedule and settings as shown in FIG. 4.

Is Child Application in required location?—The Collector Process confirms if the Child Application is in the correct location on the Computer System for this specific test.

Copy Child Application to correct location—If the Child Application is determined not to be in the correct location on the Computer System for this specific test the Collector Process will place the Child Application in the correct location Child Application has expected Hash—This is an optional test to confirm that the Child Application has not been tampered with by a malicious code or user.

Child Application has Execute File Permissions—This is a test to confirm that Security Software outside the specific one being testing will not affect the results Attempt to Execute Child Application—The Collector Process will attempt to Execute the Child Application, the successful Execution or an Error will return a result to the Collector Process.

Suppress Security Notifications—The Collector Process will attempt to suppress Security Notifications which may be generated as a result of this Substantive Test.

End test, report invalid file error—This is one of four possible responses (in the embodiment described) which could be recorded, made available and reported by the Collector Process. This response is given if the Child Application has been tampered with by a malicious user End test, report incorrect permissions error—This is the second of four possible responses which could be returned by the Collector Process. This response is given if the Collector Process suspects the response could be generated by a Security Software other than whitelisting End test, report whitelisting disabled—This is the third of four possible responses which could be returned by the Collector Process. This response is given if the Collector Process was able to Execute the Child Application without any Security Software preventing the Execution.

Report whitelisting enabled—This is the final of four possible responses which could be returned by the Collector Process. This response is given if the Collector Process received an error when it attempted to Execute the Child Application and the Collector Process suspects it was due to the Security Software protecting the Computer System.

The following is an example of an Additional Substantive Test for Microsoft Office® Macro Settings. Microsoft Office applications can Execute macros to automate routine tasks. However, macros can contain malicious code resulting in unauthorised access to sensitive information as part of a targeted cyber intrusion.

A customised Microsoft Office document with embedded code simulating malicious intent is launched by the Child Application and Executed to run Silently within the User's Context where in Notifications that are generated are supressed.

The Collector Application monitors the Execution of the Microsoft Office® document, recording whether the Macro security feature prevents Execution of the malicious code and reports on the outcome of this Substantive Test. The Collector Process also records the group policy security settings applied to the Microsoft® Office application and makes that information available or passes this information to the database for reporting.

The following is another example of an Additional Substantive Test for Testing Anti-Virus effectiveness wherein: Antivirus software detects and removes computer viruses. They provide protection from other computer threats such as malicious browser helper objects (BHOs), browser hijackers, ransomware, keyloggers, backdoors, rootkits, trojan horses, worms, malicious LSPs, dialers, fraudtools, adware and spyware, infected and malicious URLs, spam, scam and phishing attacks, online identity (privacy), online banking attacks, social engineering techniques, advanced persistent threat (APT) and botnet DDoS attacks.

The EICAR Standard Anti-Virus Test File or EICAR test file is a computer file that was developed by the European Institute for Computer Antivirus Research (EICAR) and Computer Antivirus Research Organization (CARO), to test the response of computer antivirus (AV) programs. The majority of antivirus Software programs will respond to this test file as if it is a real computer virus. This file will not cause any damage to a Computer System.

The Collector Process creates a Child Application that Silently introduces a customised version of the EICAR virus on the Computer System Any Notifications that are generated are supressed.

The Collector Application monitors the EICAR virus file, recording whether the file is deleted by the installed Antivirus Security Software and reports on the outcome of this Substantive Test. The Collector Process also records the group policy security settings applied to the Antivirus Security Software and makes that information available or passes this information to the database for reporting.

The invention claimed is:

1. A method of testing for the effectiveness of predetermined security aspects associated with a Computer System while the Operating System of the Computer System is being used by a user, having a predetermined User's Context, the steps of the method comprising:
   a) confirming that the user context has been created;
   b) Executing a Collector Process within the User's Context;
   c) Executing a Child Application within the User's Context on the Computer System, having a testing functionality according to the user's predetermined User's Context;
   d) monitoring by the Collector Process for the Execution of the Child Application, recording the output of the Child Application to make available the result of the testing;
   e) monitoring the Computer System's Operating System and suppressing any Notification to the user of the Computer System when such Notification is triggered by the creation or launch of the Child Application.

2. The method of testing according to claim 1 further including the step:
   f) reporting the recorded result of the testing.

3. The method of testing according to claim 2 wherein the recorded result is successful or unsuccessful or failed.

4. The method of testing according to claim 1 further including the step:
   g) Executing a Collector Process to verify that the Hash of the Child Application matches a known Hash wherein if the Hash of the Child Application does not match, the Collector Process will not Execute the Child Application.

5. A Computer Program product residing on a non-transitory computer-readable storage medium having a plurality of instructions stored thereon, which, when Executed by a processor associated with a Computer System, cause the processor to perform operations for testing the effectiveness of predetermined security aspects associated with the Computer System while the Computer System is being used by a user having a predetermined User's Context, the operations of the program product comprising the steps:
   a) confirming that the user context has been created;
   b) Executing a Collector Process within the User's Context;
   c) Executing a Child Application within the User's Context on the Computer System, having a testing functionality according to the user's predetermined User's Context;
   d) monitoring by the Collector Process for the Execution of the Child Application, recording the output of the Child Application to make available the result of the testing;
   e) monitoring the Computer System's Operating System and suppressing any Notification to the user of the Computer System when such Notification is triggered by the creation or launch of the Child Application.

6. The computer program according to claim 5 further including the step:
   f) reporting the recorded result of the testing as successful, unsuccessful or failed.

7. The computer program according to claim 5 further including the step:
   g) Executing a Collector Process to verify that the Hash of the Child Application matches a known Hash wherein if the Hash of the Child Application does not match, the Collector Process will not Execute the Child Application.

8. A Computer System comprising:
   i. at least one processor;
   ii. at least one memory architecture coupled with at least one processor for use by a user;
   iii. a application Executable by the at least one processor and using at least one memory architecture, wherein a Collector Process is configured to Execute a Child Application using at least one processor and at least one memory architecture, the Child Application having a testing functionality wherein the application uses the processor and memory according to the predetermined User's Context to Execute the Child Application, wherein the operations of the application comprise the steps:
      A. a step of monitoring the Execution of the Child Application, and wherein:
         a. if the Child Application does Execute that result is an indication of a failure of the security aspect that was tested; or
         b. if the Child Application is unable to either create or launch the Child Application then that result is an indication of the success of the security aspect that was tested;
      B. a step of suppression of any Notification to the user of the Computer System when the Notification is triggered by the creation or launch of the Child Application; and
      C. a step of making available of a Notification by the application of the result of the Execution of the Child Application.

9. The Computer System according to claim 8 further including the further step:
   D. reporting the recorded result of the testing as successful, unsuccessful or failed.

10. The Computer System according to claim 8 further including the further step:

E. Executing a Collector Process to verify that the Hash of the Child Application matches a known Hash wherein if the Hash of the Child Application does not match, the Collector Process will not Execute the Child Application.

\* \* \* \* \*